United States Patent [19]

Bass

[11] 3,906,376

[45] Sept. 16, 1975

[54] SYNCHRONOUS DIFFERENTIALLY COHERENT PSK DEMODULATION

[75] Inventor: Larry F. Bass, Mission Vieja, Calif.

[73] Assignee: Rockwell International Corporation, El Segundo, Calif.

[22] Filed: June 3, 1974

[21] Appl. No.: 475,551

[52] U.S. Cl. .................. 329/104; 178/88; 325/320; 325/419; 331/23; 329/122

[51] Int. Cl.$^2$ ...................... H04L 27/22; H03D 3/24

[58] Field of Search .................... 329/104, 122–126, 329/112; 331/12, 14, 18, 23, 25; 325/320, 346, 419; 178/88

[56] References Cited

UNITED STATES PATENTS

| | | | |
|---|---|---|---|
| 3,456,196 | 7/1969 | Schneider | 325/419 X |
| 3,638,125 | 1/1972 | Goell | 329/122 X |
| 3,745,255 | 7/1973 | Fletcher et al. | 329/122 X |
| 3,753,114 | 8/1973 | Burley | 329/123 X |
| 3,768,030 | 10/1973 | Brown et al. | 331/25 X |
| 3,787,775 | 1/1974 | Lanning | 325/320 X |
| 3,806,815 | 4/1974 | Fletcher et al. | 329/122 X |

*Primary Examiner*—Alfred L. Brody
*Attorney, Agent, or Firm*—Howard R. Greenberg

[57] ABSTRACT

A synchronous differentially coherent PSK communication signal is demodulated by applying the signal to a phase lock loop circuit whose output is sampled once every bit period in accordance with a sample control signal which is generated each time phase lock is lost as a result of the change in phase of the communication signal, as determined by comparing the phase of the communication signal with that of the phase lock loop tracking signal, phase lock being lost and restored during each bit period.

12 Claims, 1 Drawing Figure

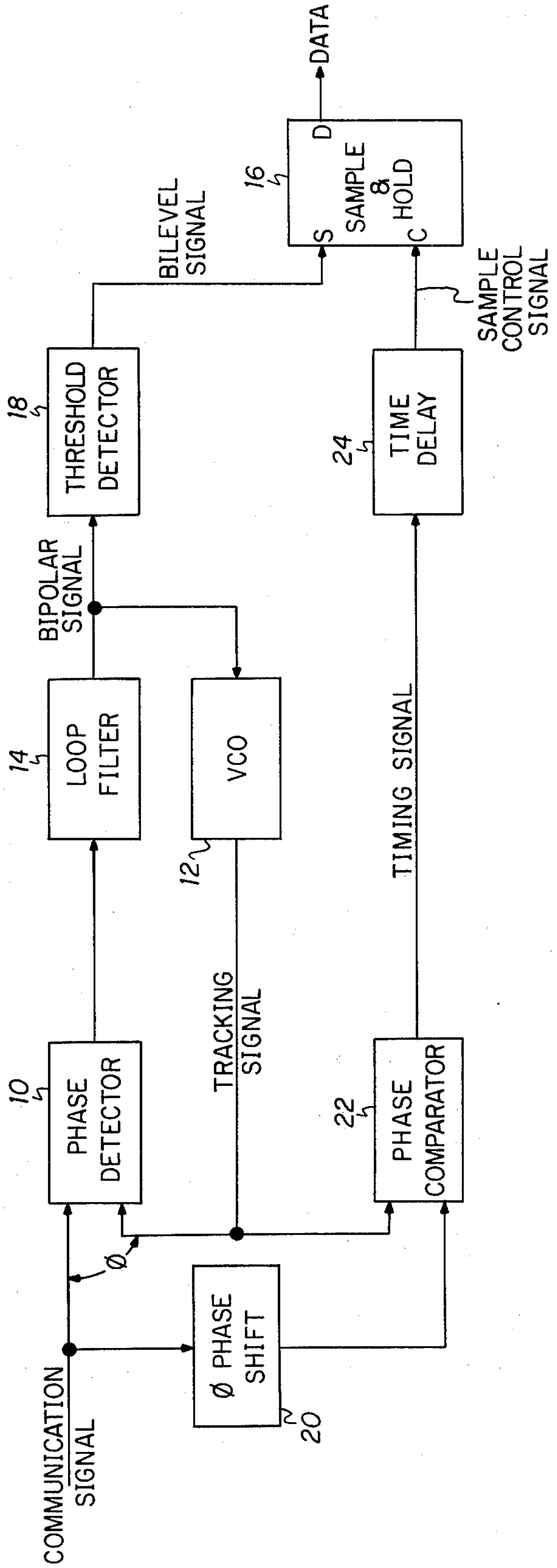
DATA
D
S
C
SAMPLE & HOLD
16
BILEVEL SIGNAL
SAMPLE CONTROL SIGNAL
THRESHOLD DETECTOR
18
TIME DELAY
24
BIPOLAR SIGNAL
LOOP FILTER
14
VCO
12
TIMING SIGNAL
TRACKING SIGNAL
PHASE DETECTOR
10
PHASE COMPARATOR
22
Ø
Ø PHASE SHIFT
20
COMMUNICATION SIGNAL

SYNCHRONOUS DIFFERENTIALLY COHERENT PSK DEMODULATION

BACKGROUND OF THE INVENTION

The present invention lies in the field of electronic data communications generally and pertains specifically to demodulating synchronous differentially coherent phase shift keying communication signals.

With the burgeoning expansion of the data communications field has come a need for developing transmitting and receiving equipment which is sophisticated enough to meet the technical requirements of the communications system and format utilized, yet which is priced so as to be attractive to the buying public and economically competitive with other systems and formats. Because of the pervasive use of solid state equipment throughout the data communications field and the cost savings to be derived therefrom, an important system design consideration herein is how easily the design is implemented using already commercially available solid state equipment.

In one type of modulation used for passing binary data, commonly referred to as synchronous differentially coherent phase shift keying (PSK) the phase of a sinusoidal carrier is advanced or regressed in each bit period from the immediately preceding bit period by a prescribed amount, such as 90° in accordance with the modulation information, the direction being dependent on whether the data is a logic one or zero. Phase advancement denotes one logic level while phase regression denotes the other logic level. Demodulation is then performed and the data retrieved at the receiving end by comparing the phase of the communication signal in each bit period with the phase of the signal in the immediately preceding bit period to determine the directional change and consequently the logic level associated therewith.

With the foregoing in mind, it is a primary object of the present invention to provide a new and improved technique for demodulating a synchronous differentially coherent PSK communication signal.

It is a further object of the present invention to provide such a technique which is simply and easily implemented using readily commercially available solid-state equipment.

These and other objects will be readily apparent upon reference to the detailed description of the invention which follows hereinafter when considered together with the single appended drawing which is a detailed functional block diagram of the preferred embodiment of the invention.

BRIEF DESCRIPTION OF THE INVENTION

The invention herein effectuates demodulation of a synchronous differentially coherent PSK communication signal by first developing a tracking signal for tracking the communication signal through the use of a phase lock loop circuit to which the communication signal is applied. Although phase lock is intentionally lost at the beginning of each bit period, the response time of the phase lock loop circuit relative to the bit rate of the communication signal is fast enough so that phase lock is always restored during that bit period prior to loss of phase lock during the immediately following bit period as a result of a phase change in the communication signal. The D.C. analog output of the phase lock loop circuit is sampled during each bit period in response to a sample control signal which is generated after a time interval following loss of phase lock which is greater than the D.C. analog response time necessary to indicate loss of phase lock, but less than that necessary to indicate subsequent resumption of phase lock each time phase lock is lost, which will naturally occur during the transition from one bit period to the next. The sampled value indicative of the binary data logic level is then held until the next sample is taken.

Loss of phase lock is detected by comparing the phase of the communication signal with that of the tracking signal at all times. Since the phase difference therebetween upon achieving phase lock is a predetermined amount, dependent on phase lock loop operation, any deviation therefrom is an immediate indication that phase lock has been lost because of a phase change in the communication signal and may therefore be used to note the beginning of a bit period. In the preferred embodiment disclosed herein, the loss of phase lock is detected by first shifting the phase of the communication or tracking signal by the aforementioned predetermined fixed amount for phase lock loop operation in such a direction that when phase lock is achieved, the shifted and unshifted signals have the same phase and then comparing the phase of each with the other. Each time the phase comparator detects a phase difference it generates a timing signal which initiates the sample control signal which is then applied to a sample and hold circuit to effectuate the sampling. Time delay means is provided to delay the sample control signal for a prescribed time interval to accommodate the D.C. analog response time of the phase lock loop circuit.

DETAILED DESCRIPTION OF THE INVENTION

As shown in the appended drawing, the invention employs a standard phase lock loop circuit consisting of a phase detector 10 whose output is applied to a voltage controlled oscillator (VCO) 12 via a loop filter 14. If the reader is interested in the detailed description of a typical phase lock loop circuit he may refer to a U.S. Pat. No. 3,431,509 entitled "Phase Locked Loop With Digitalized Frequency And Phase Discriminator." The phase lock loop circuit performs in accordance with well known principles of phase lock loop operation, so that a tracking signal produced at the output of VCO 12 continuously changes phase, as required, to maintain a constant phase differential $\phi$ (in a prescribed direction as well as magnitude) with respect to another input signal against which it is compared in phase detector 10. Although $\phi$ can be made to assume any value, it is commonly 90°. The output of loop filter 14 provides a D.C. analog signal which is linearly proportional to the phase difference between the tracking signal and the other input signal to phase detector 10 at all times and assumes a quiescent value, normally 0, when phase lock is achieved. When the phase of the other input signal changes so that it leads the tracking signal, the D.C. analog output of loop filter 14 changes in one direction relative to the quiescent value until phase lock is restored and similarly it will change in the other direction when the input signal phase lags the tracking signal until phase lock is restored. Since in differentially coherent PSK modulation, one is only interested in the directional change in phase of the communication signal and not the magnitude thereof, the D.C.

analog output of loop filter 14 is significant to the present invention in that it provides a bipolar signal with respect to the quiescent value just discussed indicative of the directional phase change in the communication signal. In the present operation, although phase lock is intentionally lost at the beginning of each bit period, it is restored during the period prior to loss of phase lock in the immediately ensuing bit period.

The other input to phase detector 10 against which the tracking signal is compared is the synchronous differentially coherent PSK communication signal to be demodulated. As mentioned earlier, this communication signal consists of a sinusoidal carrier whose phase is shifted by the same amount $\phi$ used for phase lock loop operation at the beginning of each bit period with respect to the immediately preceding bit period phase of the communication signal, advancing for one logic level and regressing for the other level. By determining whether the phase of the carrier signal advanced or regressed in a given bit period by comparing the phase with the immediately preceding bit period phase one is able to determine if the bit constitutes a logic level one or zero. This comparison can be performed by sampling the output of the loop filter 14 since the polarity of the aforementioned bipolar signal during any bit period is a direct measure of the directional change in phase of the communication signal relative to the tracking signal and the tracking signal phase at the beginning of any bit period is always indentical to that of the communication signal in the immediately preceding bit period (because phase lock is always achieved in each bit period).

It is important that the output of loop filter 14 not be sampled until sufficient time has passed for the output to respond to a phase change in the input communication signal to phase detector 10 thereby reflecting the phase change by assuming one polarity or the other for the bipolar signal. To assure reliable operation which minimizes errors caused by transients, it may be desirable to sample only after the bipolar signal has had sufficient time to attain its maximum value corresponding to the phase change $\phi$ which typically may be in the order of 2.5 milliseconds. With a carrier frequency of 3 Hz and a bit period of 20 milliseconds which have been actually employed in practicing the invention; the restoration of phase lock during each bit period is assured. On the other hand, it is important that the sample be taken before phase lock is restored subsequent to the phase change in the communication signal which initially gave rise to the loss of phase lock, lest the information reflected in the bit period be lost. Thus, for the instant example, there is a time slot of 2.5 milliseconds during which the sample may be taken, 2.5 milliseconds being the response time for the D.C. analog signal.

Sampling is performed by a sample and hold circuit 16 having one input S connected to the output of loop 14, preferably via a threshold detector circuit 18, for receiving the information and another input C for controlling the time at which the sample is taken in response to a sample control signal applied thereto. Each time a sample control signal is received on input C of the sample and hold circuit 16 whatever signal level appearing on its S input is transferred to its output lead D where it is held until receipt of the next sample control signal. The signal appearing on output lead D constitutes the binary data retrieved from the synchronous differentially coherent PSK communication signal. There are many well known sample and hold circuits, such as a D-type flip-flop where information to the input is transferred to the output when toggled by a clock signal, for performing the required function and therefore nothing more need be said in regard thereto. The threshold detector circuit 18 can be any one of well known circuits such as a Schmitt Trigger for converting the bipolar input thereto to a bilevel output (the threshold level being set to the aforementioned quiescent value for the D.C. analog output), which is desirable from a design viewpoint to assure that the input signal to the sample and hold circuit 16 is in a binary format and has levels which are compatible with operating level requirements. Of course if timing is precise so that the D.C. analog output of loop filter 14 always has the same magnitude when sampled and its levels are directly usable, then the threshold detector 18 can be dispensed with.

The sample control signal applied to the sample and hold circuit 16 is generated by a sample control circuit comprising a $\phi$ phase shift circuit 20, a phase comparator circuit 22, and a time delay circuit 24. Phase shift circuit 20 and phase comparator 22 are used to detect the beginning of each bit period to provide a timing signal at the output of phase comparator 22 for controlling the time at which the sample control signal is applied to the sample and hold circuit 16. Since phase lock is always achieved during a bit period and immediately lost at the beginning of the next bit period, loss of phase lock can be used for marking the beginning of each bit period by comparing the phase of the communication signal with that of the tracking signal. Thus, when the phase difference therebetween deviates from $\phi$, which corresponds to phase lock, it can only be attributable to a phase change in the communication signal as a result of the modulation information and therefore the beginning of a new bit period. As shown in the appended drawing, the communication signal is shifted by an amount $\phi$, in such a direction that the phase of the shifted signal matches that of the tracking signal whenever phase lock is achieved, so that at that time there is no phase difference between the input signals to phase comparator 22. At the beginning of each bit period the phase change in the communication signal $\phi$ is reflected through phase shift circuit 20 so that the input signals to the phase comparator 22 at that time differ by an amount $\phi$ which causes the phase comparator 22 to generate a timing signal at its output. Thus, a timing signal is generated at the beginning of each bit period which lasts until the input signals to phase comparator 22 have no phase difference which occurs upon restoration of phase lock. Phase shift circuits and phase comparators are well known so that the details thereof need not be provided here. It is worth mentioning, however, that phase comparator 22 could be very simply an exclusive OR gate for producing the required function. It should also be mentioned that phase shift circuit 20 could just as well be placed in the tracking signal path to either phase detector 10 or phase comparator 22 rather than the communication signal path — in the latter case, the direction of phase shift $\phi$ would be simply reversed.

The timing signal applied to the input of time delay circuit 24 is reflected at the output thereof as the sample control signal after a prescribed time interval provided by delay circuit 24 which preferably should be at least equal to the D.C. analog response time for the phase lock loop circuit. This assures that the sample control signal for controlling the time at which the output of loop filter 14 is sampled is not generated before the D.C. analog output has had an opportunity to change to its maximum value in response to a change $\phi$ in phase of the communication signal. Time delay circuit 24 may take any one of many well known forms to perform its required function. For example, it could very well be implemented with the use of a one-shot multivibrator circuit which is triggered by the timing signal and whose transitions back to its stable state provides the sample control signal.

As may very well be appreciated, the invention described herein provides a very simple and facile technique for retrieving both clock and data from a differentially coherent PSK communication signal to perform demodulation thereof. All of the required components are well known and most, if not all, indeed are commercially available as solid-state devices. Consequently, the invention can be commercially constructed easily and inexpensively making it highly competitive. Since various modifications to the preferred embodiment described herein may be readily apparent to those skilled in the art which do not depart from the scope and spirit of the invention, the foregoing embodiment should be considered as merely exemplary and not restrictive of the invention which is now claimed hereinbelow.

What is claimed is:

1. A demodulator for demodulating a synchronous differentially coherent PSK communication signal wherein the modulation phase shift is $\phi$, comprising:

phase lock loop circuit means for receiving the communication signal and generating in response thereto a tracking signal which differs in phase therefrom by an amount $\phi$ once phase lock is achieved and for providing a D.C. analog output linearly proportional to the phase difference between the communication and tracking signal and wherein phase lock is lost at the beginning but restored prior to the end of each bit period of the communication signal;

sample control circuit means for detecting each time phase lock is lost and generating in response thereto a sample control signal; and sample and hold circuit means responsive to the sample control signal for sampling the D.C. analog output of said phase lock loop circuit means and holding the sampled value until receipt of the next sample control signal.

2. The demodulator of claim 1 wherein said sample control circuit means includes means for measuring the phase difference between the communication and tracking signals and for generating a timing signal to which the sample control signal is responsive whenever the phase difference deviates from $\phi$.

3. The demodulator of claim 2 wherein said phase difference measuring means includes phase shift means for shifting the phase of the communication signal with respect to the tracking signal by an amount $\phi$ in a direction so that upon achieving phase lock the shifted and unshifted signals are in phase and phase comparator means for comparing the phase of the two so as to generate a timing signal whenever these phases are different.

4. The demodulator of claim 2 including time delay circuit means for generating the sample control signal after a prescribed time interval following receipt of the timing signal which is at least equal to the D.C. analog response time of said phase lock loop circuit.

5. The demodulator of claim 1 wherein $\phi$ is 90°.

6. The demodulator of claim 1 wherein said sample and hold circuit means includes threshold detector circuit means through which the D.C. analog is sampled so as to always provide a bilevel signal for sampling.

7. A method for demodulating a synchronous differentially coherent PSK communication signal wherein the modulation phase shift is $\phi$ comprising:

generating a tracking signal which follows the phase of the communication signal so as to maintain a phase difference of $\phi$ therebetween constituting phase lock, said phase lock being lost at the beginning but being restored prior to the end of each communication signal bit period.

generating a bipolar signal wherein one polarity denotes that the phase of the communication signal leads that of the tracking signal and the other polarity denotes that the communication signal phase lags that of the tracking signal;

detecting each time phase lock is lost and generating in response thereto a sample control signal, and in response to the sample control signal, sampling the bipolar signal and holding the sampled value until the next sample control signal occurs.

8. The method of claim 7 wherein loss of phase lock is detected by measuring the phase difference between the communication and tracking signals to determine whenever the phase difference deviates from $\phi$.

9. The method of claim 8 wherein the phase difference measurement is performed by shifting the phase of either the communication or tracking signal by an amount $\phi$ in a direction so that upon achieving phase lock the shifted and unshifted signals are in phase and generating a timing signal whenever the shifted and unshifted signals have different phases.

10. The method of claim 7 wherein $\phi$ is 90°.

11. The method of claim 7 wherein the bipolar signal is converted to a bilevel signal before being sampled.

12. The method of claim 7 wherein the sample control signal is delayed a prescribed time interval in response to the timing signal which is at least equal to the response time for the bipolar signal.

* * * * *